M. KIRKHAM.
Plow Fender.

No. 78,100.

Patented May 19, 1868.

Witnesses
George Kopham
Nathan Riley Whitehead

Inventor
Michall Kirkham

United States Patent Office.

MICHAEL KIRKHAM, OF EMINENCE POST OFFICE, INDIANA.

Letters Patent No. 78,100, dated May 19, 1868.

IMPROVEMENT IN SHIELD-PLOUGH.

The Schedule referred to in these Letters Patent and making part of the same.

TO ALL WHOM IT MAY CONCERN:

Be it known that I, MICHAEL KIRKHAM, of Eminence Post Office, Morgan county, State of Indiana, have invented a new and useful mode of preventing clods (in ploughing small corn) from falling upon the corn, whilst it permits the loose soil to pass through the grate-shield and fall around the roots of this corn; and I do hereby declare that the following is a full, clear, and exact description of the construction and operation of the same, reference being had to the accompanying drawings, and letters of reference marked thereon.

To enable others skilled in making and using my invention, I shall proceed to describe its construction and operation.

Figure 1:
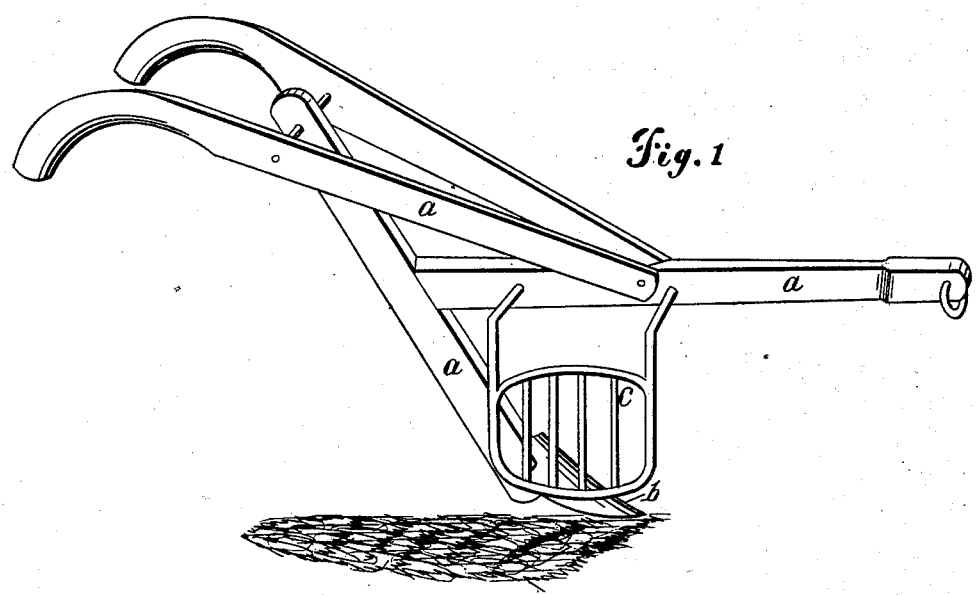
Figure 2:
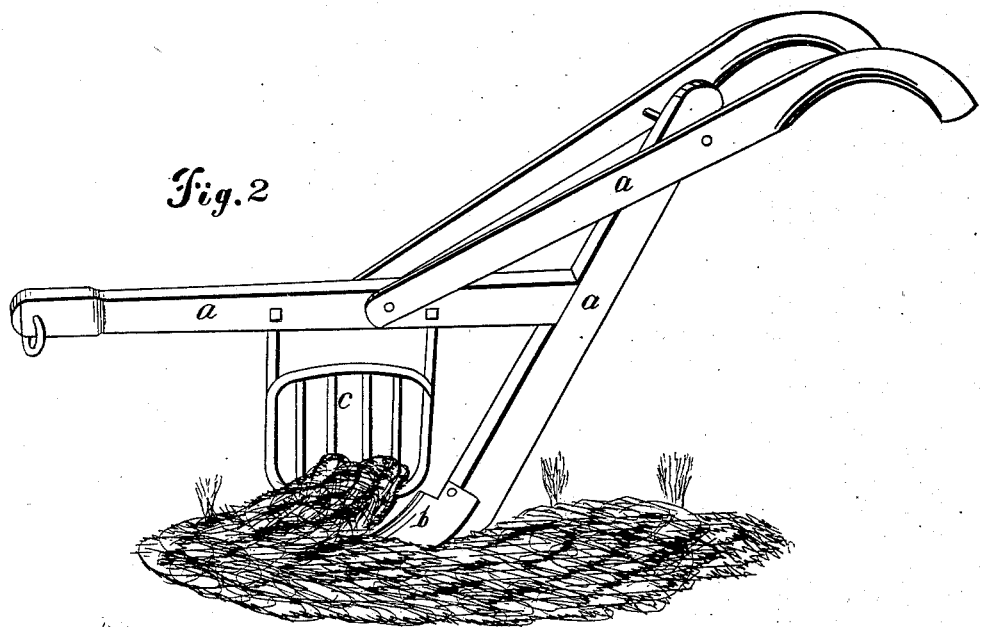

Figures 1 and 2 represent the two views, and letters $a\ a\ a$, on the drawings, represent the wooden part of the plough. $b$ represents the ploughshare, and $c$ the clod-shield, which prevents the clods from falling upon the small corn, whilst it permits the loose soil to pass through this shield-grate and fall around the roots. This shield can be attached to any kind of plough, single or double.

I do not claim the wooden part of the plough, nor do I claim the ploughshare, nor any other part of it; but

I claim the above-described shield, when made of rigid vertical bars, having both their lower and upper ends united by rigid horizontal bars, substantially as set forth.

MICHAEL KIRKHAM.

Witnesses:
GEORGE KIRKHAM,
NATHAN RILEY WHITEHEAD.